(12) United States Patent
Lee et al.

(10) Patent No.: US 12,251,984 B2
(45) Date of Patent: Mar. 18, 2025

(54) INTEGRATED THERMAL MANAGEMENT SYSTEM FOR A VEHICLE

(71) Applicants: Hyundai Motor Company, Seoul (KR); Kia Corporation, Seoul (KR)

(72) Inventors: Sang Shin Lee, Suwon-Si (KR); Man Ju Oh, Yongin-Si (KR); Ki Mok Kim, Hwaseong-Si (KR); Uk Il Yang, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/517,424

(22) Filed: Nov. 2, 2021

(65) Prior Publication Data

US 2022/0176773 A1 Jun. 9, 2022

(30) Foreign Application Priority Data

Dec. 7, 2020 (KR) .......................... 10-2020-0169780

(51) Int. Cl.
*B60H 1/00* (2006.01)
*B60H 1/14* (2006.01)
*B60H 1/32* (2006.01)

(52) U.S. Cl.
CPC ..... *B60H 1/00278* (2013.01); *B60H 1/00385* (2013.01); *B60H 1/00885* (2013.01);
(Continued)

(58) Field of Classification Search
CPC ............ B60H 1/00278; B60H 1/00885; B60H 1/00899; B60H 1/00921; B60H 1/143;
(Continued)

(56) References Cited

U.S. PATENT DOCUMENTS 5,549,153 A 8/1996 Baruschke et al.
6,651,761 B1 * 11/2003 Hrovat .................... B60L 15/20
165/41
(Continued)

FOREIGN PATENT DOCUMENTS

CN 103068602 4/2013
CN 105764727 7/2016
(Continued)

OTHER PUBLICATIONS

Maryam Alizadeh et al. "Real Time Ambien Temp Estimation Using Kalman Filter and Traction Power-Aware Cabin Climate control in Battery Electric Vehicles" 2022 IEEE/AIAA Transpo Electrification Conf and Electric Aircraft Tech Symposiums; pp. 261 to 266.

(Continued)

*Primary Examiner* — Ljiljana V. Ciric
(74) *Attorney, Agent, or Firm* — Morgan, Lewis & Bockius LLP

(57) ABSTRACT

An integrated thermal management system for a vehicle includes a refrigerant line; a first coolant line for circulating coolant and connecting a first radiator, the high-temperature core, a heating core of an internal air conditioner, and a high-voltage battery with each other in parallel; a second coolant line for circulating coolant and connecting a second radiator, an electronic driving part, the low-temperature core, and a cooling core of the internal air conditioner with each other in parallel; and a third coolant line for circulating coolant and connecting a third radiator and the high-voltage battery to the second coolant line in parallel.

18 Claims, 12 Drawing Sheets

(52) U.S. Cl.
CPC ..... *B60H 1/00899* (2013.01); *B60H 1/00921* (2013.01); *B60H 1/143* (2013.01); *B60H 1/32284* (2019.05); *B60H 2001/00307* (2013.01); *B60H 2001/00928* (2013.01)

(58) Field of Classification Search
CPC ...... B60H 1/32284; B60H 2001/00307; B60H 2001/00928; B60H 1/00385; B60H 3/024; B60Y 2200/91; F01P 7/165; F01P 3/12; F01P 5/10; F01P 2005/105; F01P 2007/146
See application file for complete search history.

(56) References Cited

U.S. PATENT DOCUMENTS

| | | | | |
|---|---|---|---|---|
| 7,047,913 | B2* | 5/2006 | Werner | F02B 29/0443 |
| | | | | 123/563 |
| 7,789,176 | B2* | 9/2010 | Zhou | B60L 58/26 |
| | | | | 180/65.1 |
| 7,975,757 | B2* | 7/2011 | Nemesh | H01M 10/6568 |
| | | | | 165/42 |
| 8,215,432 | B2* | 7/2012 | Nemesh | H01M 16/006 |
| | | | | 429/62 |
| 8,336,319 | B2 | 12/2012 | Johnson et al. | |
| 8,402,776 | B2 | 3/2013 | Johnson et al. | |
| 8,555,826 | B2* | 10/2013 | Feldhaus | F01P 7/165 |
| | | | | 123/41.31 |
| 8,899,062 | B2* | 12/2014 | Kadle | B60H 1/00342 |
| | | | | 62/333 |
| 9,212,599 | B2* | 12/2015 | Gao | B60L 58/21 |
| 9,261,093 | B2* | 2/2016 | Skelton | B60L 1/003 |
| 9,555,691 | B2* | 1/2017 | Tschismar | B60H 1/00914 |
| 9,701,215 | B1* | 7/2017 | Kim | B60L 58/33 |
| 10,076,944 | B2* | 9/2018 | Jalilevand | B60L 1/02 |
| 10,118,458 | B2 | 11/2018 | Kim | H01M 10/663 |
| 10,166,835 | B2* | 1/2019 | Kim | B60H 1/00485 |
| 10,173,491 | B2* | 1/2019 | Kim | B60H 1/00007 |
| 10,183,544 | B2* | 1/2019 | Kim | F25B 25/005 |
| 10,252,597 | B2* | 4/2019 | Wallace | B60L 58/27 |
| 10,252,599 | B2* | 4/2019 | Kim | B60H 1/00392 |
| 10,532,630 | B2* | 1/2020 | Lee | B60H 1/00885 |
| 10,562,367 | B2* | 2/2020 | Oh | B60H 1/323 |
| 10,766,338 | B2* | 9/2020 | Oh | B60H 1/00278 |
| 10,875,382 | B2* | 12/2020 | Ben Ahmed | B60H 1/143 |
| 10,889,157 | B2* | 1/2021 | Kim | B60H 1/00278 |
| 10,987,998 | B2* | 4/2021 | Kim | B60H 1/00885 |
| 11,110,772 | B2* | 9/2021 | Oh | B60H 1/32284 |
| 11,142,037 | B2* | 10/2021 | Kim | B60H 1/00278 |
| 11,155,138 | B2* | 10/2021 | Kim | B60H 1/00007 |
| 11,173,769 | B2* | 11/2021 | Oh | B60H 1/00278 |
| 11,192,425 | B2* | 12/2021 | Oh | B60H 1/00571 |
| 11,207,941 | B2* | 12/2021 | Lee | B60H 1/00885 |
| 11,325,445 | B2* | 5/2022 | Kim | B60H 1/00007 |
| 11,433,735 | B2* | 9/2022 | Allgaeuer | B60H 1/00428 |
| 11,458,812 | B2* | 10/2022 | Jeong | B60H 1/00907 |
| 11,541,725 | B2* | 1/2023 | Oh | H01M 10/6568 |
| 11,850,908 | B2* | 12/2023 | Benouali | F25B 40/00 |
| 2008/0251235 | A1* | 10/2008 | Zhou | B60L 50/51 |
| | | | | 165/59 |
| 2009/0280395 | A1* | 11/2009 | Nemesh | H01M 10/615 |
| | | | | 429/62 |
| 2012/0180980 | A1* | 7/2012 | Malvicino | B60H 1/00907 |
| | | | | 165/42 |
| 2012/0234518 | A1* | 9/2012 | Brodie | F28D 20/028 |
| | | | | 165/104.31 |
| 2012/0297805 | A1* | 11/2012 | Kamada | B60H 1/32281 |
| | | | | 62/208 |
| 2012/0304674 | A1* | 12/2012 | Schwarzkopf | B60H 1/00878 |
| | | | | 62/238.1 |
| 2012/0318012 | A1 | 12/2012 | Choi et al. | |
| 2013/0074525 | A1* | 3/2013 | Johnston | B60H 1/323 |
| | | | | 62/126 |
| 2013/0284415 | A1 | 10/2013 | Katoh | |
| 2014/0041826 | A1 | 2/2014 | Takeuchi | |
| 2014/0284034 | A1 | 9/2014 | Kadle | |
| 2015/0202986 | A1 | 7/2015 | Hatakeyama et al. | |
| 2015/0258875 | A1 | 9/2015 | Enomoto et al. | |
| 2015/0273976 | A1* | 10/2015 | Enomoto | B60L 3/0046 |
| | | | | 62/243 |
| 2016/0082805 | A1* | 3/2016 | Graaf | B60H 1/04 |
| | | | | 62/238.7 |
| 2016/0107506 | A1 | 4/2016 | Johnston | |
| 2016/0339767 | A1* | 11/2016 | Enomoto | F25B 25/005 |
| 2016/0351981 | A1 | 12/2016 | Porras et al. | |
| 2017/0158081 | A1* | 6/2017 | Kim | H01M 10/6568 |
| 2017/0253105 | A1* | 9/2017 | Allgaeuer | B60H 1/143 |
| 2018/0208014 | A1* | 7/2018 | Ben Ahmed | B60H 1/3211 |
| 2018/0208061 | A1* | 7/2018 | Ben Ahmed | B60H 1/00899 |
| 2018/0312034 | A1* | 11/2018 | Koberstein | B60H 1/00271 |
| 2018/0339570 | A1 | 11/2018 | Lee et al. | |
| 2018/0345757 | A1 | 12/2018 | Oh et al. | |
| 2019/0009635 | A1* | 1/2019 | Oh | B60H 1/00885 |
| 2019/0047361 | A1* | 2/2019 | Lee | B60H 1/00885 |
| 2019/0047369 | A1* | 2/2019 | Kim | F25B 1/04 |
| 2019/0168578 | A1 | 6/2019 | Kim | |
| 2019/0176571 | A1 | 6/2019 | Oh et al. | |
| 2019/0308491 | A1 | 10/2019 | Lee et al. | |
| 2020/0338956 | A1* | 10/2020 | Oh | B60H 1/00899 |
| 2020/0346523 | A1 | 11/2020 | Oh et al. | |
| 2020/0353796 | A1* | 11/2020 | Oh | B60H 1/143 |
| 2020/0384827 | A1* | 12/2020 | Oh | B60H 1/00428 |
| 2020/0391570 | A1* | 12/2020 | Lee | B60R 16/04 |
| 2020/0398636 | A1 | 12/2020 | He et al. | |
| 2021/0001686 | A1* | 1/2021 | Kim | B60H 1/00921 |
| 2021/0016632 | A1* | 1/2021 | Oh | B60H 1/00278 |
| 2021/0053415 | A1* | 2/2021 | Oh | B60H 1/00571 |
| 2021/0331554 | A1* | 10/2021 | Mancini | B60H 1/00921 |
| 2022/0176773 | A1* | 6/2022 | Lee | B60H 1/00278 |
| 2023/0356566 | A1* | 11/2023 | Kim | B60H 1/00007 |
| 2024/0140163 | A1* | 5/2024 | Mancini | B60H 1/32281 |

FOREIGN PATENT DOCUMENTS

| | | | | |
|---|---|---|---|---|
| CN | 106004337 | | 10/2016 | |
| CN | 106470858 | | 3/2017 | |
| CN | 106558741 | | 4/2017 | |
| CN | 106828022 | | 6/2017 | |
| CN | 107097664 | | 8/2017 | |
| CN | 107351629 | | 11/2017 | |
| CN | 107351632 | | 11/2017 | |
| CN | 107438527 | | 12/2017 | |
| CN | 107839496 | | 3/2018 | |
| CN | 108973582 | | 12/2018 | |
| CN | 109070687 | | 12/2018 | |
| CN | 109383217 | | 2/2019 | |
| CN | 109383218 | | 2/2019 | |
| CN | 109383219 | | 2/2019 | |
| CN | 109383221 | | 2/2019 | |
| CN | 109638381 | | 4/2019 | |
| CN | 109641507 | | 4/2019 | |
| CN | 109661316 | | 4/2019 | |
| CN | 109760483 | | 5/2019 | |
| CN | 109895590 | | 6/2019 | |
| CN | 109927534 | | 6/2019 | |
| CN | 111278670 | | 6/2020 | |
| CN | 111845248 | | 10/2020 | |
| CN | 111907288 | A * | 11/2020 | B60H 1/00278 |
| DE | 102007063251 | | 7/2009 | |
| DE | 102011090147 | | 7/2013 | |
| DE | 102012010697 | | 12/2013 | |
| DE | 102014111971 | | 2/2016 | |
| DE | 112014005360 | | 8/2016 | |
| DE | 112014005360 | T5 | 8/2016 | |
| DE | 102017221557 | A * | 2/2019 | B60H 1/00007 |
| DE | 102018108317 | A1 * | 6/2019 | B60H 1/00278 |
| DE | 102019008255 | A1 * | 6/2020 | B60K 11/02 |
| DE | 102019132494 | A1 * | 10/2020 | B60H 1/00271 |
| EP | 2066884 | B1 | 8/2011 | F01P 3/18 |
| EP | 3760459 | A1 * | 1/2021 | B60H 1/00007 |
| FR | 3005901 | | 11/2014 | |
| FR | 3092651 | A1 * | 8/2020 | B60H 1/00278 |
| JP | 06081648 | A * | 6/1994 | |

(56) References Cited

FOREIGN PATENT DOCUMENTS

| | | | |
|---|---|---|---|
| JP | 2014020239 A * | 2/2014 | |
| JP | 2014-219156 | 11/2014 | |
| JP | 2015-186989 | 10/2015 | |
| JP | 2019-031109 | 2/2019 | |
| KR | 10-2008-0045377 | 5/2008 | |
| KR | 10-2012-0137099 | 12/2012 | |
| KR | 10-1448656 | 10/2014 | |
| KR | 10-1703604 | 2/2017 | |
| KR | 10-2017-0067502 | 6/2017 | |
| KR | 10-1787503 | 10/2017 | |
| KR | 10-2017-0142683 | 12/2017 | |
| KR | 10-1846924 | 5/2018 | |
| KR | 10-2018-0078074 | 7/2018 | |
| KR | 10-2018-0093184 | 8/2018 | |
| KR | 10-2019-0033115 | 3/2019 | |
| KR | 20-2019-0000904 U | 4/2019 | |
| KR | 10-2019-0127219 | 11/2019 | |
| KR | 20-2019-0003481 U | 1/2021 | |
| SE | 1050516 A1 * | 11/2011 | |
| SE | 535877 C2 * | 1/2013 | ............... F01P 3/20 |
| SE | 1651011 A1 * | 1/2018 | |
| WO | WO-2012002248 A1 * | 1/2012 | ............... F25B 7/00 |
| WO | WO2014/136446 | 9/2014 | |
| WO | WO-2016188666 A1 * | 12/2016 | ............... B60H 1/00 |
| WO | WO-2018009122 A1 * | 1/2018 | ......... B60H 1/00278 |
| WO | WO2019/138176 | 7/2019 | |
| WO | WO-2020126619 A1 * | 6/2020 | ............... B60K 1/00 |
| WO | WO-2020165511 A1 * | 8/2020 | ......... B60H 1/00278 |

OTHER PUBLICATIONS

Al Zhihua "Study of an Integrated Thermal Management System for Battery Electric Vehicle Heat Pump Air Conditioner and Power System", B.E. (Taiyuan Univ Technology) 2015—A Thesis submitted in partial satisfaction of the requirements for the Degree of Science in Vehicle Engineering in Hunan University.

Zhang Tianshi et al. "Numerical model and Computational Analysis on Battery Thermal Management System with Heat Pump Auxiliary Cooling", State Key Laboratory of Automotive Simulation and Control, Jilin University, Changchun 130022, China.

"Heat Pump Analysis of BMW i3 Pure Electric Vehicle Air Conditioning System" source: Automotive Maintenance Technician School.

Liu Zhiyong, et al. "Design andoptimization for air conditioning system and battery thermal management system of electric vehicle" Refrigeration and Air-Conditioning; vol. 18 Issue, Jan. 1, 2018; p. 67-71.

Duan Yanli, et al. "Experimental Study on Battery Cooling System of Electric Vehicle".

* cited by examiner

INTEGRATED THERMAL MANAGEMENT SYSTEM FOR A VEHICLE

CROSS REFERENCE TO RELATED APPLICATION

The present application claims priority to Korean Patent Application No. 10-2020-0169780, filed Dec. 7, 2020, the entire contents of which is incorporated herein for all purposes by this reference.

BACKGROUND OF THE INVENTION

Field of the Invention

The present invention relates to an integrated thermal management system for a vehicle, wherein a use amount of a refrigerant may be extremely reduced to be eco-friendly, and at the same time a package size of a coolant line is also decreased by reducing the number of required water pumps and multi-way valves, so that all necessary modes are able to be implemented while saving overall cost and reducing weight, and energy may be saved due to a high recovery rate of waste heat.

Description of Related Art

Recently, as an eco-friendly vehicle, an electric vehicle and the like are spreading due to environmental issues of internal combustion engine vehicles. However, in the case of an existing internal combustion engine vehicle, the interior thereof may be heated through waste heat of an engine, so energy for separate heating is not required. Whereas, in the case of the electric vehicle and the like, there is a problem in that heating may be performed by use of additional energy because the electric vehicle has no engine and no heat source, resulting in reducing electrical energy efficiency. Furthermore, the present problem causes shortening of the driving distance of the electric vehicle, causing inconvenience such as requiring frequent charging.

Meanwhile, due to the electrification of a vehicle, the need of thermal management has been newly added for not only the interior of the vehicle but also electronic components such as a high-voltage battery and a motor. That is, in the case of an electric vehicle and the like, an internal space, a battery, and an electronic component each have different needs for air conditioning, and thus it is necessary to have a technology in which energy may be saved as much as possible in an efficient and collaborative way while responding independently to each different need. Accordingly, an integrated thermal management concept of the vehicle has been provided to increase thermal efficiency by integrating the overall thermal management of the vehicle while independently performing thermal management for each component.

To perform such an integrated thermal management of a vehicle, it is necessary to integrate complex coolant lines and components to be modularized, so a concept of compact modularization is necessary in terms of simple manufacturing and packaging as well while modularizing a plurality of components.

Furthermore, recently, a demand for an eco-friendly technology is increasing and a use of a new refrigerant is required. However, the price of these new refrigerants is high, so it is true that the overall price of a vehicle is increased and maintenance is also not easy. Therefore, there is a demand for a technology in which existing refrigerants are used, while dramatically reducing the use amount of the refrigerants, facilitating vehicle manufacturing and maintenance in an eco-friendly manner.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an integrated thermal management system for a vehicle, wherein a use amount of a refrigerant may be extremely reduced to be eco-friendly, and at the same time a package size of a coolant line is also decreased by reducing the number of required water pumps and multi-way valves, so that all necessary modes are able to be implemented while saving overall cost and reducing weight, and energy may be saved due to a high recovery rate of waste heat.

According to various exemplary embodiments of the present invention for achieving the above objective, an integrated thermal management system of a vehicle includes: a refrigerant line provided with a compressor, a high-temperature core, an expansion valve, and a low-temperature core and through which a refrigerant is circulated; a first coolant line for circulating coolant and connecting a first radiator, the high-temperature core, a heating core of an internal air conditioner, and a battery with each other in parallel; a second coolant line for circulating the coolant and connecting a second radiator, an electronic driving part, the low-temperature core, and a cooling core of the internal air conditioner with each other in parallel; and a third coolant line for circulating the coolant and connecting a third radiator and the battery to the second coolant line in parallel.

At least one or more multi-way valves may be provided at branch points of the first coolant line, the second coolant line, and the third coolant line.

A first water pump may be provided on the high-temperature core side of the first coolant line.

A second water pump may be provided on the electronic driving part side of the second coolant line.

A third water pump may be provided on the third radiator side of the third coolant line.

An outlet of the cooling core of the second coolant line and an outlet of the battery of the third coolant line may be joined with each other, and a fourth water pump may be provided at a point of confluence therebetween.

During cooling the electronic driving part by outside air, the coolant may be circulated to the second radiator through the second coolant line, and during cooling the battery by the outside air, the coolant may be circulated to the third radiator through the third coolant line.

When a high level of cooling is required for the battery, the high-temperature core may radiate heat through the first coolant line and the first radiator, and the battery may be cooled through the third coolant line and the low-temperature core.

When the high level of cooling of the battery and internal cooling are required at a same time, the cooling core may be cooled through the second coolant line and the low-temperature core.

When heating is required, the battery may be heated through the first coolant line and the high-temperature core, and the low-temperature core may recover waste heat through the second coolant line and the electronic driving part, or recover the waste heat through the third coolant line and the third radiator.

When internal heating is required, the heating core may be heated through the first coolant line and the high-temperature core, and the low-temperature core may recover the waste heat through the second coolant line and the electronic driving part, or recover the waste heat through the third coolant line and the third radiator.

When internal heating is required, the heating core may be heated through the first coolant line and the high-temperature core, and the low-temperature core may recover the waste heat through the third coolant line and the battery.

When internal dehumidification is required, the heating core may be heated through the first coolant line and the high-temperature core, and the cooling core may be cooled through the second coolant line and the low-temperature core.

When internal heating and internal dehumidification are required at a same time, the heating core may be heated through the first coolant line and the high-temperature core, the cooling core may be cooled through the second coolant line and the low temperature core, and the low-temperature core may recover the waste heat through the third coolant line and the third radiator.

When internal heating and internal dehumidification are required at a same time, the heating core may be heated through the first coolant line and the high-temperature core, the cooling core may be cooled through the second coolant line and the low-temperature core, and the low-temperature core may recover the waste heat through the second coolant line and the electronic driving part.

According to the integrated thermal management system of a vehicle of the present invention, the use amount of the refrigerant may be extremely reduced to be eco-friendly, and at the same time the package size of the coolant line is also decreased by reducing the number of required water pumps and multi-way valves, so that all necessary modes are able to be implemented while saving the overall cost and reducing the weight, and the energy may be saved due to the high recovery rate of the waste heat.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
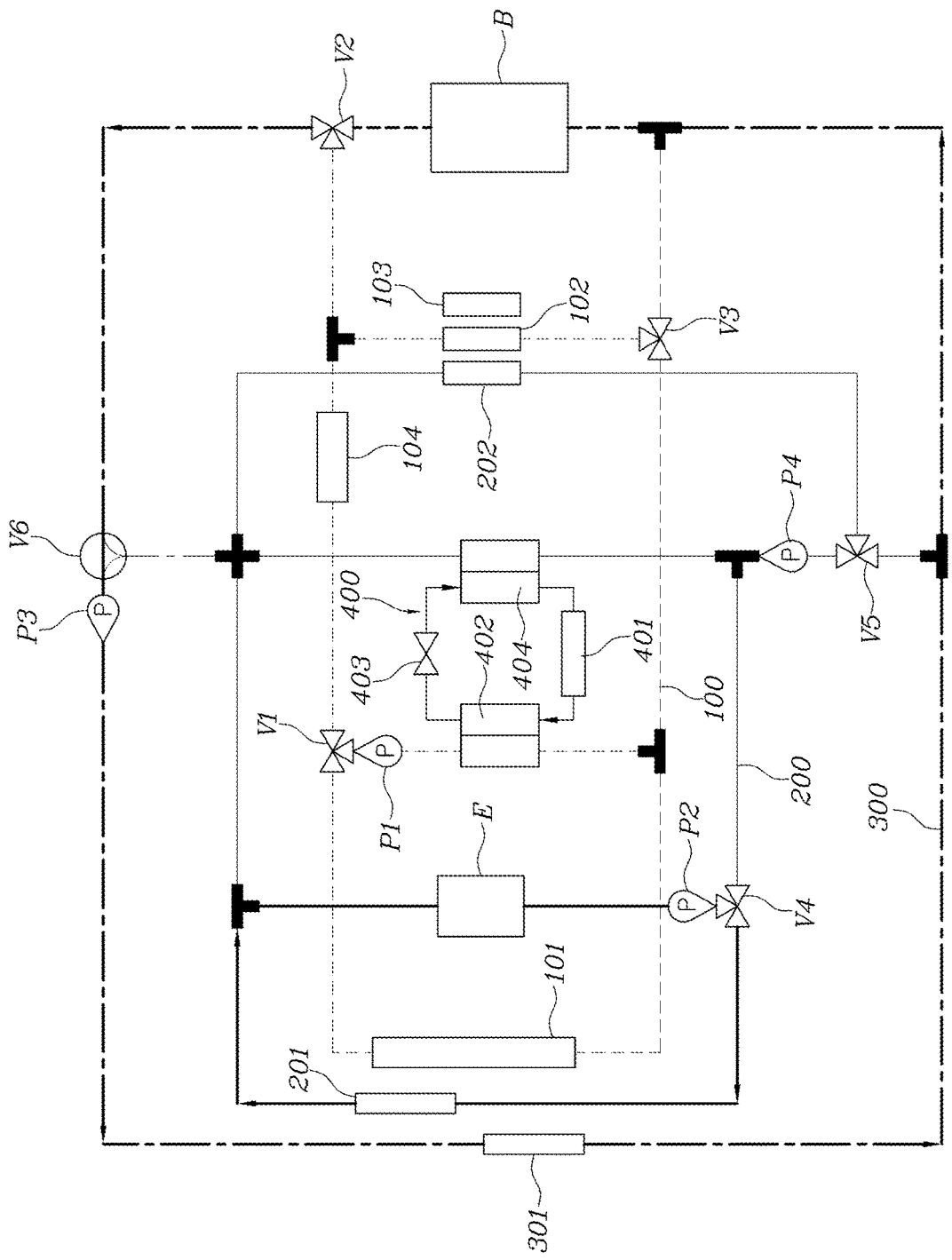
FIG. 1, FIG. 2, FIG. 3, FIG. 4, FIG. 5, FIG. 6, FIG. 7, FIG. 8, FIG. 9, FIG. 10, FIG. 11 and FIG. 12 are views for explaining an operation mode of an integrated thermal management system for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

FIG. 1, FIG. 2, FIG. 3, FIG. 4, FIG. 5, FIG. 6, FIG. 7, FIG. 8, FIG. 9, FIG. 10, FIG. 11 and FIG. 12 are views for explaining an operation mode of an integrated thermal management system for a vehicle according to various exemplary embodiments of the present invention.

The present invention relates to a vehicle-wide integrated thermal management system configured for being applied to an eco-friendly vehicle such as an electric vehicle, independently air conditioning each internal space and each electronic driving part such as a high-voltage battery, a motor, and an inverter, and recovering waste heat to maximize energy efficiency.

The present invention reduces a use amount of a refrigerant as much as possible to be eco-friendly, and indirectly operates air conditioning by use of coolant rather than directly cooling or heating an object by use of the refrigerant, so that the size and scale of a refrigerant cycle system may be significantly reduced.

Meanwhile, in the instant case, a flow of coolant around the refrigerant cycle system may become very complicated, but for the present case, the present invention simplifies a configuration of a coolant line and greatly reduces the number of water pumps and multi-way valves, so that a system which is inexpensive, lightweight, and easy to maintain is provided.

FIG. 1 is a view showing a basic system configuration of the present invention. With reference to the present view, the configuration of the present invention will be described. The integrated thermal management system for a vehicle according to various exemplary embodiments of the present invention may include a compressor 401; a high-temperature core 402; an expansion valve 403; and a low-temperature core 404, and also a refrigerant line 400 through which a refrigerant is circulated is provided therein. The system does not directly air-condition the refrigerant line 400, but indirectly performs air conditioning through the high-temperature core 402 and the low-temperature core 404. Accordingly, the high-temperature core 402 and the low-temperature core 404 are respectively provided with the refrigerant and coolant that flow through independent flow paths therein, each provided as a heat exchanger that performs heat exchange with each other.

Furthermore, the compressor 401 and the expansion valve 403 are provided for heating the high-temperature core 402 and cooling the low-temperature core 404, and accordingly, in terms of the cooling cycle, the high-temperature core 402 is configured as a condenser and the low-temperature core 404 is configured as an evaporator. Furthermore, the compressor 401 and the expansion valve 403 each perform heat exchange with the coolant. Thus, when configuring a refrigerant line in the present way, the compressor 401, the high-temperature core 402, the expansion valve 403, and the low-temperature core 404 are compactly assembled and provided in a certain small space in a compact manner, so that the size of the refrigerant cycle system is reduced to become very compact and the use amount of refrigerant is minimized, being eco-friendly.

Furthermore, the present invention is provided with three radiators of a first radiator 101, a second radiator 201, and a third radiator 301, and is also provided with three coolant lines of a first coolant line 100, a second coolant line 200, and a third coolant line 300.

The first coolant line 100 circulates the coolant, and connects the first radiator 101, the high-temperature core 402, a heating core 102 of an internal air conditioner, and a high-voltage battery B, with each other in parallel. The second coolant line 200 circulates the coolant, and connects the second radiator 201, an electronic driving part E, the low-temperature core 404, and a cooling core 202 of the internal air conditioner, with each other in parallel. The third coolant line 300 circulates the coolant, and connects the third radiator 301 and the high-voltage battery B to the second coolant line 200 in parallel.

That is, the high-temperature core 402 radiates heat to the first radiator 101 through the first coolant line 100, or performs internal heating through the heating core 102. Furthermore, through the second coolant line 200, the low-temperature core 404 performs internal cooling by use of the cooling core 202, or absorbs waste heat from the electronic driving part E.

Furthermore, through the third coolant line 300, the high-voltage battery B radiates heat to the third radiator 301, or provides the waste heat to the low-temperature core 404.

Furthermore, at least one or more multi-way valves may be provided at branch points of the first coolant line 100, the second coolant line 200, and the third coolant line 300. As shown in FIG. 1, in the first coolant line 100, a first valve V1 is provided on a branch side of the high-temperature core 402, a second valve V2 is provided on a branch side of the high-voltage battery B, and a third valve V3 is provided on a branch side of the heating core 102. Furthermore, in the second coolant line 200, a fourth valve V4 is provided on a branch side of the electronic driving part E, and a fifth valve V5 is provided on a branch side of the cooling core 202. Furthermore, in the third coolant line 300, a sixth valve V6 is provided on a branch side of the high-voltage battery B, the third radiator 301, and the low-temperature core 404.

Furthermore, a first water pump P1 may be provided on the high-temperature core 402 side of the first coolant line 100, a second water pump P2 may be provided on the electronic driving part E side of the second coolant line 200, and a third water pump P3 may be provided on the third radiator 301 side of the third coolant line 300. Meanwhile, an outlet of the cooling core 202 of the second coolant line 200 and an outlet of the high-voltage battery B of the third coolant line 300 are joined with each other, and a fourth water pump P4 may be provided at a point of confluence therebetween.

Accordingly, it is possible to independently cool and heat, the interior, the electronic driving part, and the high-voltage battery through six three-way valves and four water pumps, selectively use outside air or a refrigerant line, and effectively absorb the waste heat.

FIG. 1 shows a case where the electronic driving part E and the high-voltage battery B are cooled by the outside air. During cooling the electronic driving part E by the outside air, the coolant is circulated to the second radiator 201 through the second coolant line 200, and during cooling the high-voltage battery B by the outside air, the coolant may be circulated to the third radiator 301 through the third coolant line 300

Figure 2:
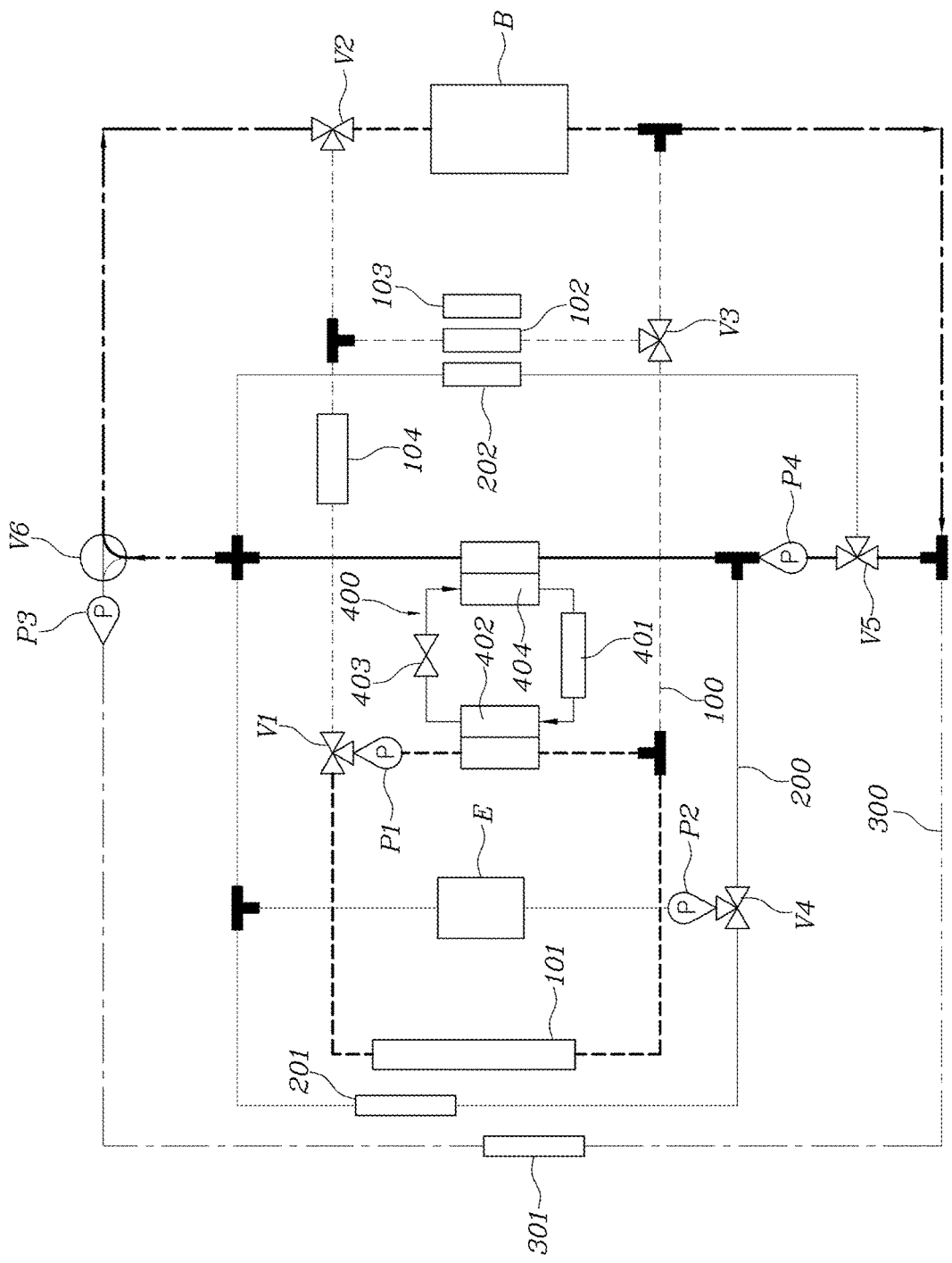

FIG. 2 shows a case where a high level of cooling is required for the high-voltage battery B. In the instant case, the high-temperature core 402 radiates heat through the first coolant line 100 and the first radiator 101, and the high-voltage battery B may be cooled through the third coolant line 300 and the low-temperature core 404. This is the case where the refrigerant is used, and thus the compressor may be driven.

Figure 3:
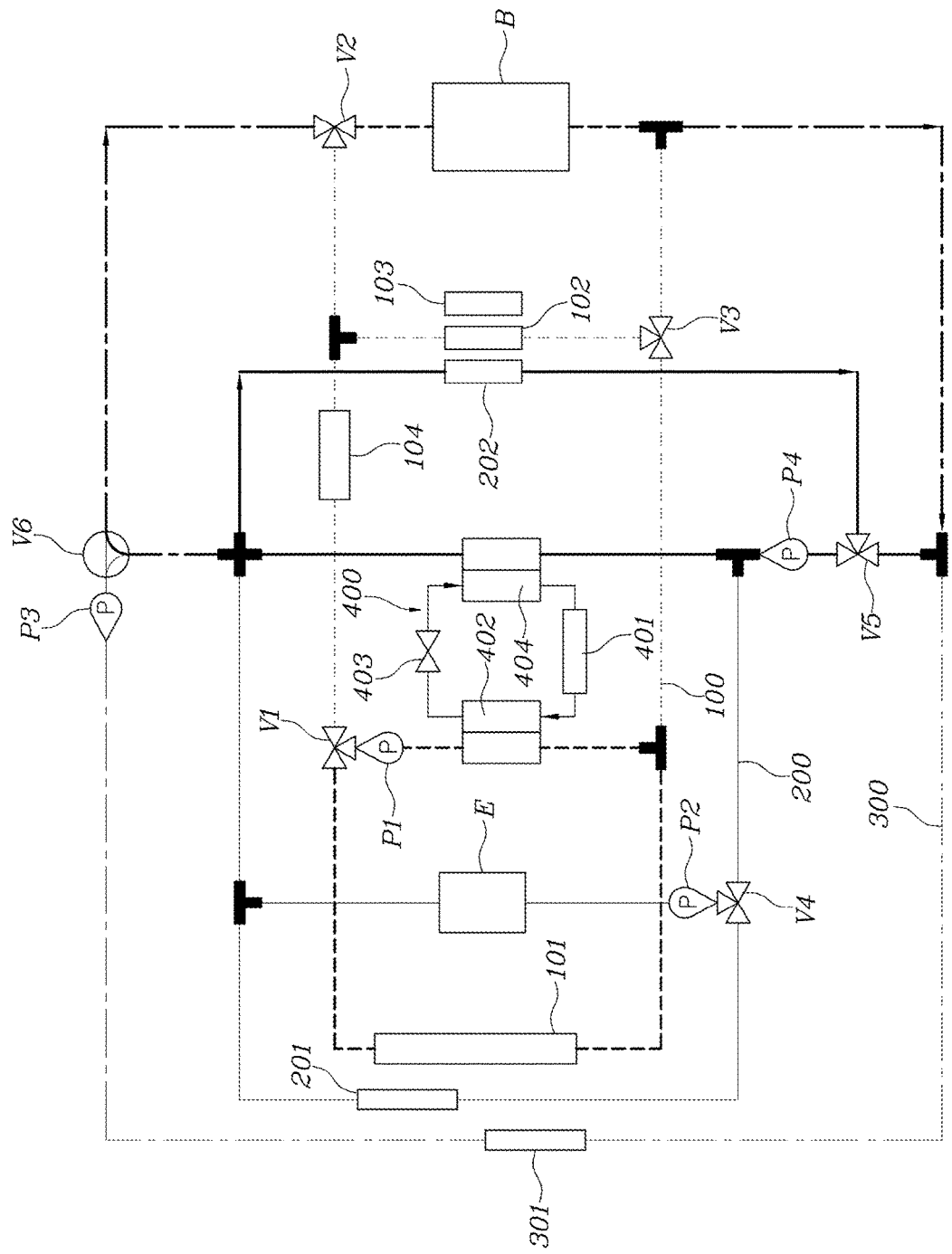

FIG. 3 shows a case where a high level of cooling for the high-voltage battery B and internal cooling are required at the same time. In the instant case, the high-temperature core 402 radiates heat through the first coolant line 100 and the first radiator 101, the high-voltage battery B is cooled through the third coolant line 300 and the low-temperature core 404, and at the same time, the cooling core 202 may be cooled through the second coolant line 200 and the low-temperature core 404.

Figure 4:
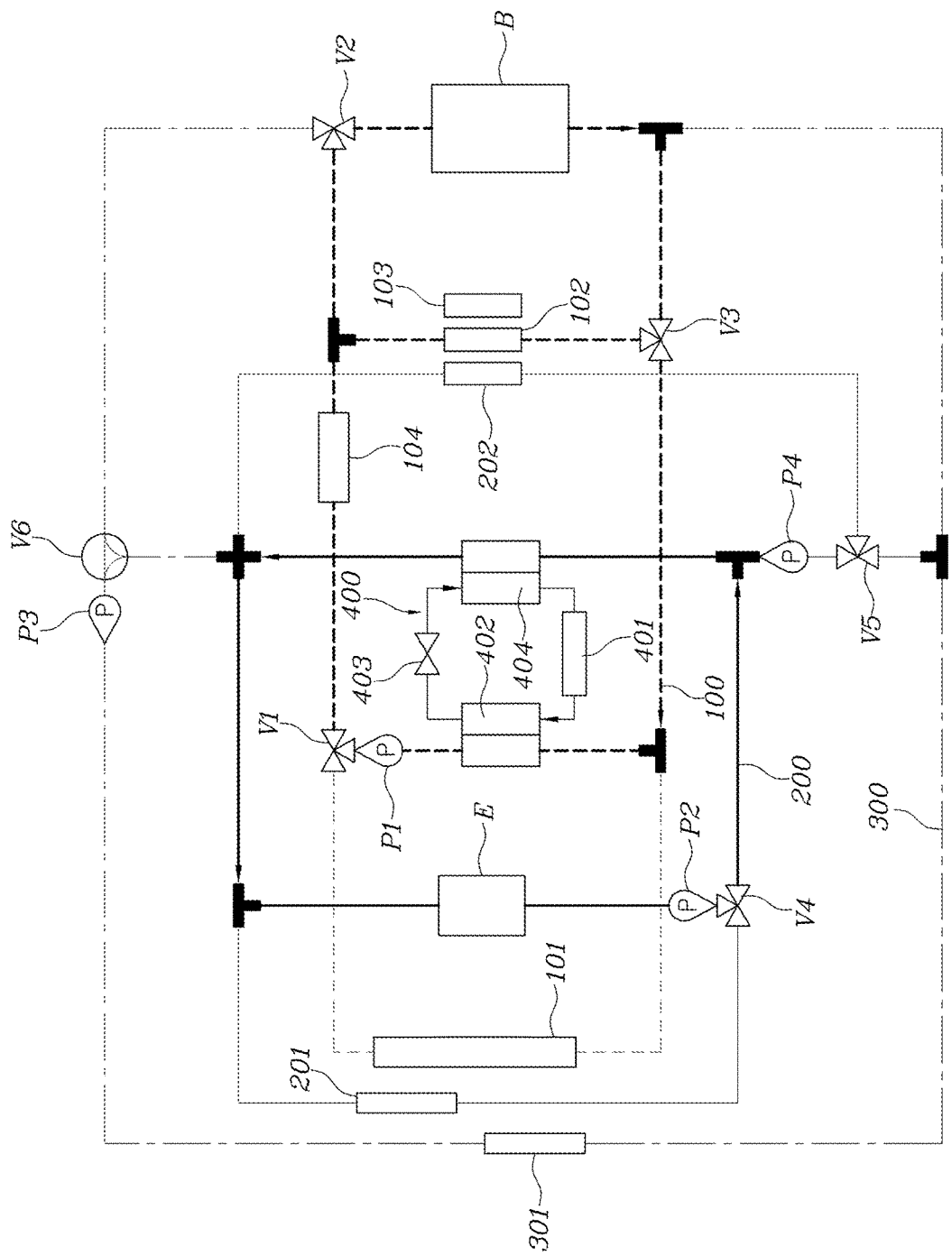
Figure 5:
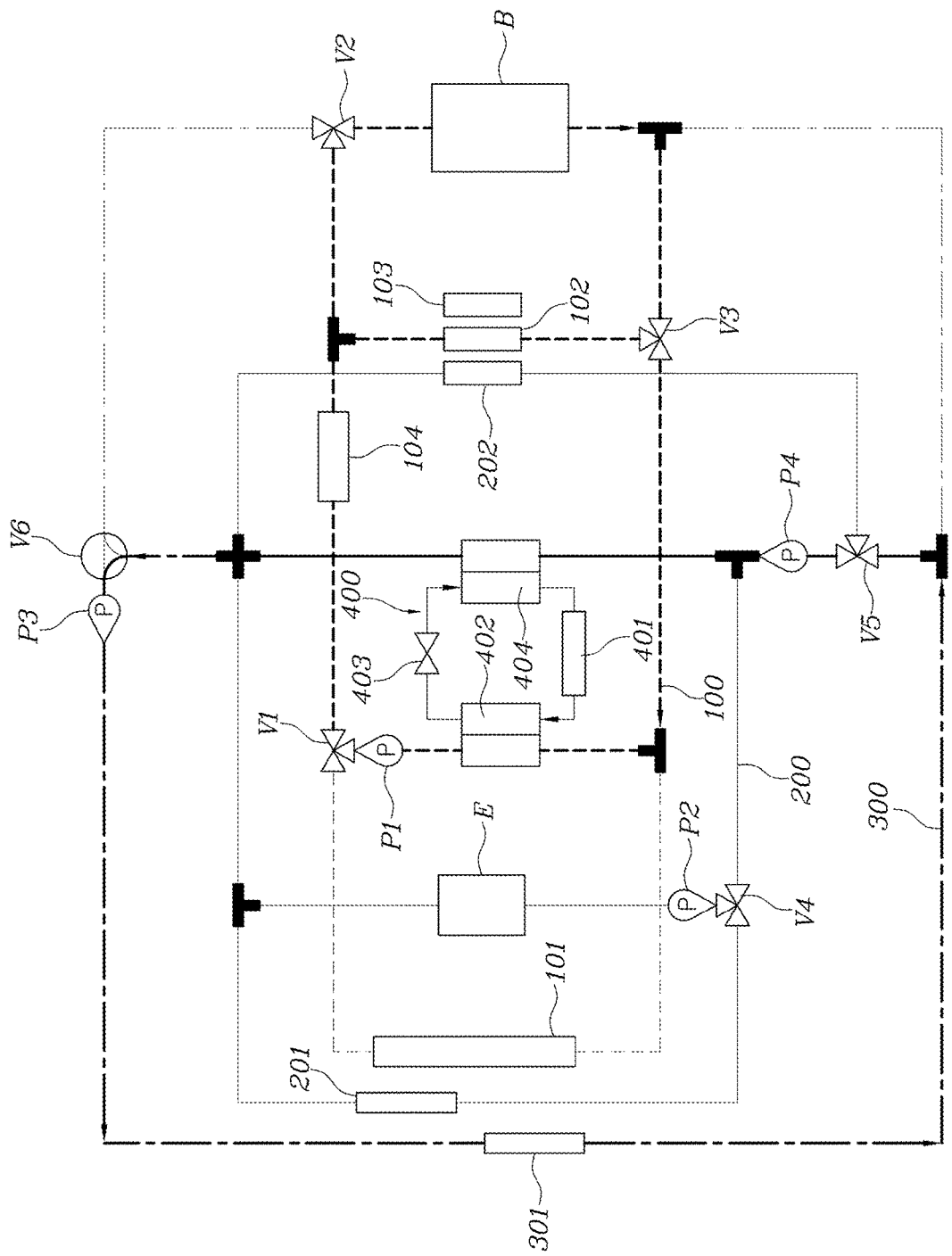

FIG. 4 shows a case where the high-voltage battery B is required to be heated. In the instant case, the high-voltage battery B is heated through the first coolant line 100 and the high-temperature core 402, the low-temperature core 404 may recover waste heat through the second coolant line 200 and the electronic driving part E, or may recover the waste heat of the outside air through the third coolant line 300 and the third radiator 301, as shown in FIG. 5. Furthermore, in the instant case, when increase of additional temperature is required, it is possible to further increase the temperature of the high-voltage battery B by operating a water heater 104 of the first coolant line 100.

Figure 6:
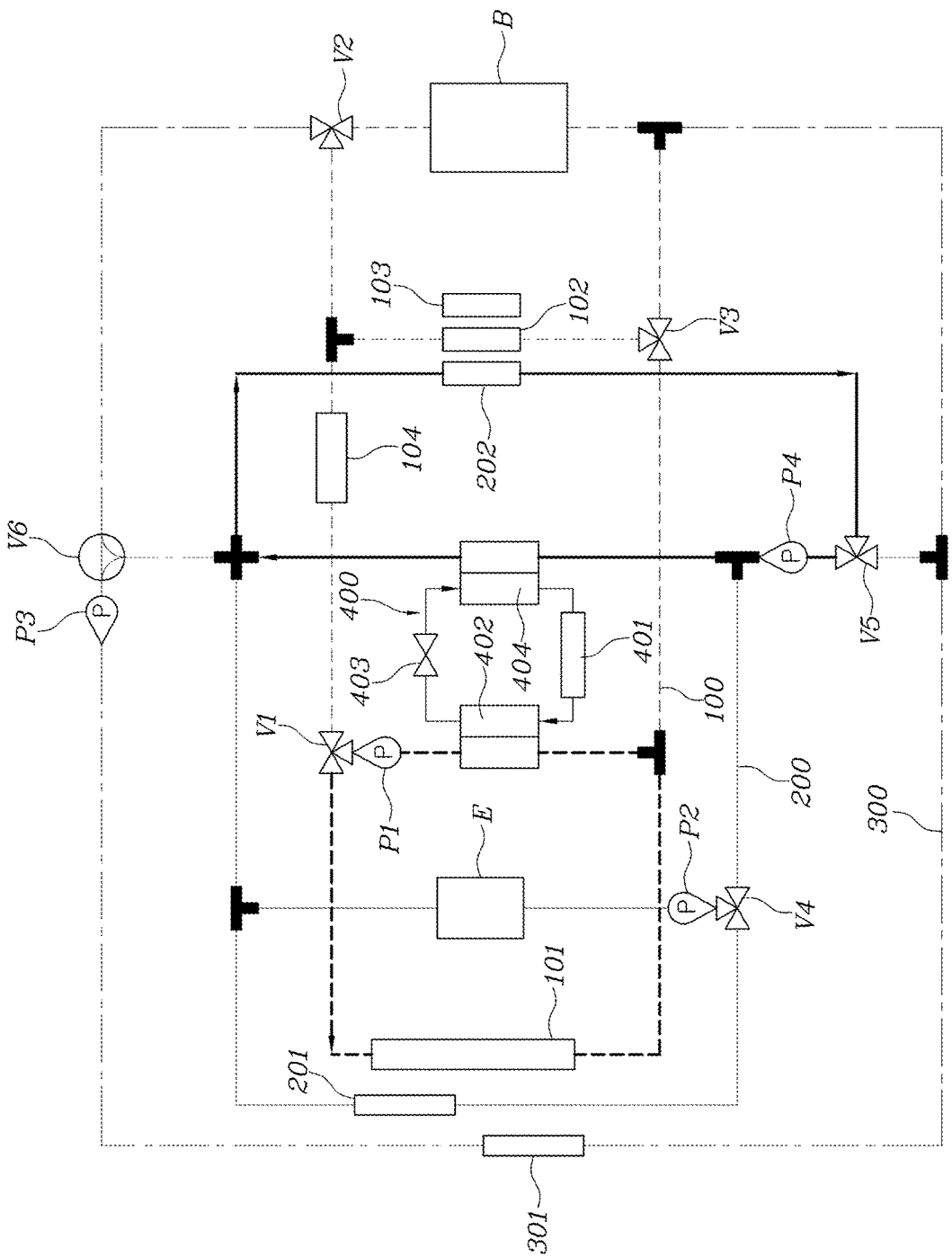

FIG. 6 shows a case where internal cooling is required and the cooling core 202 is cooled through the low-temperature core 404.

Figure 7:
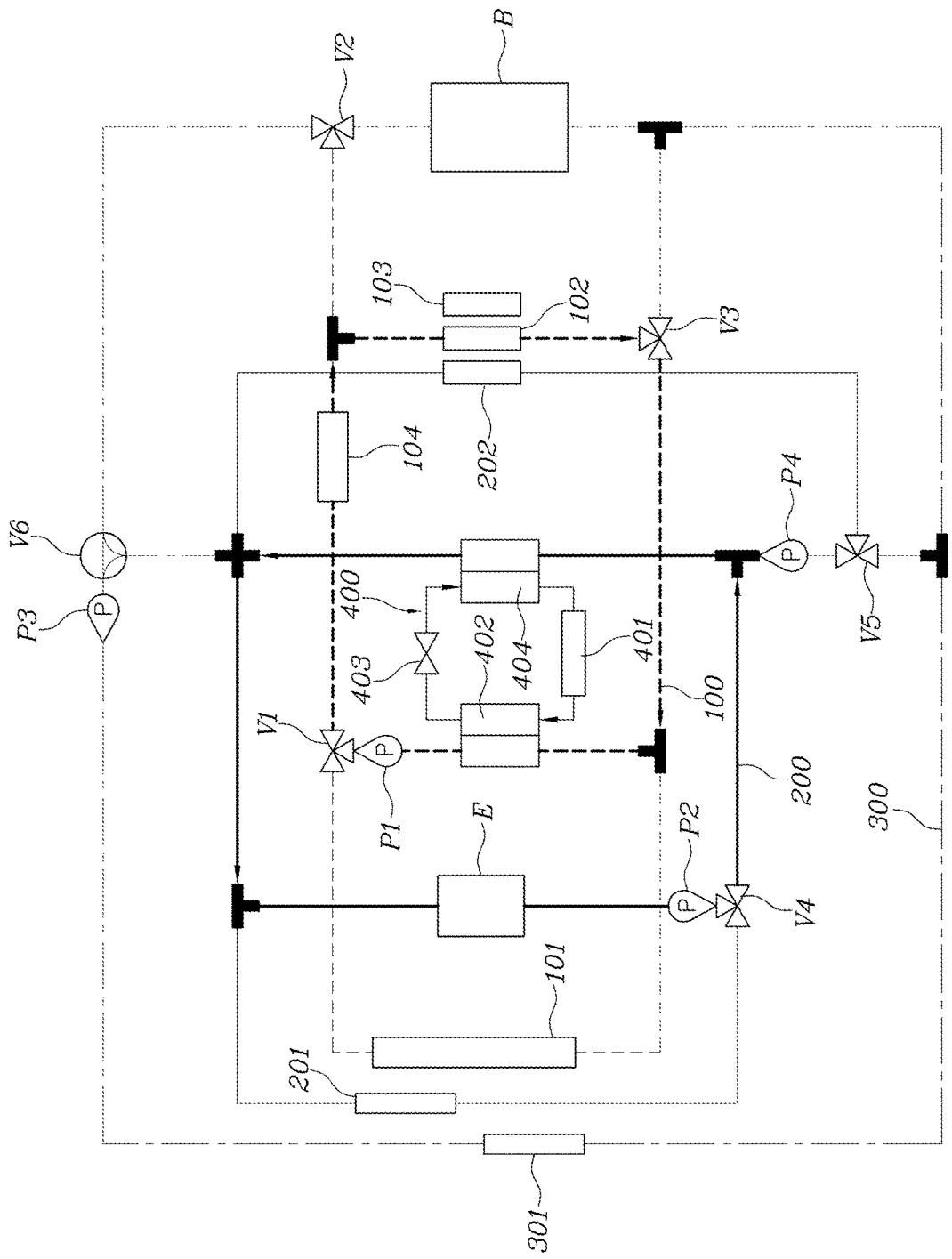
Figure 8:
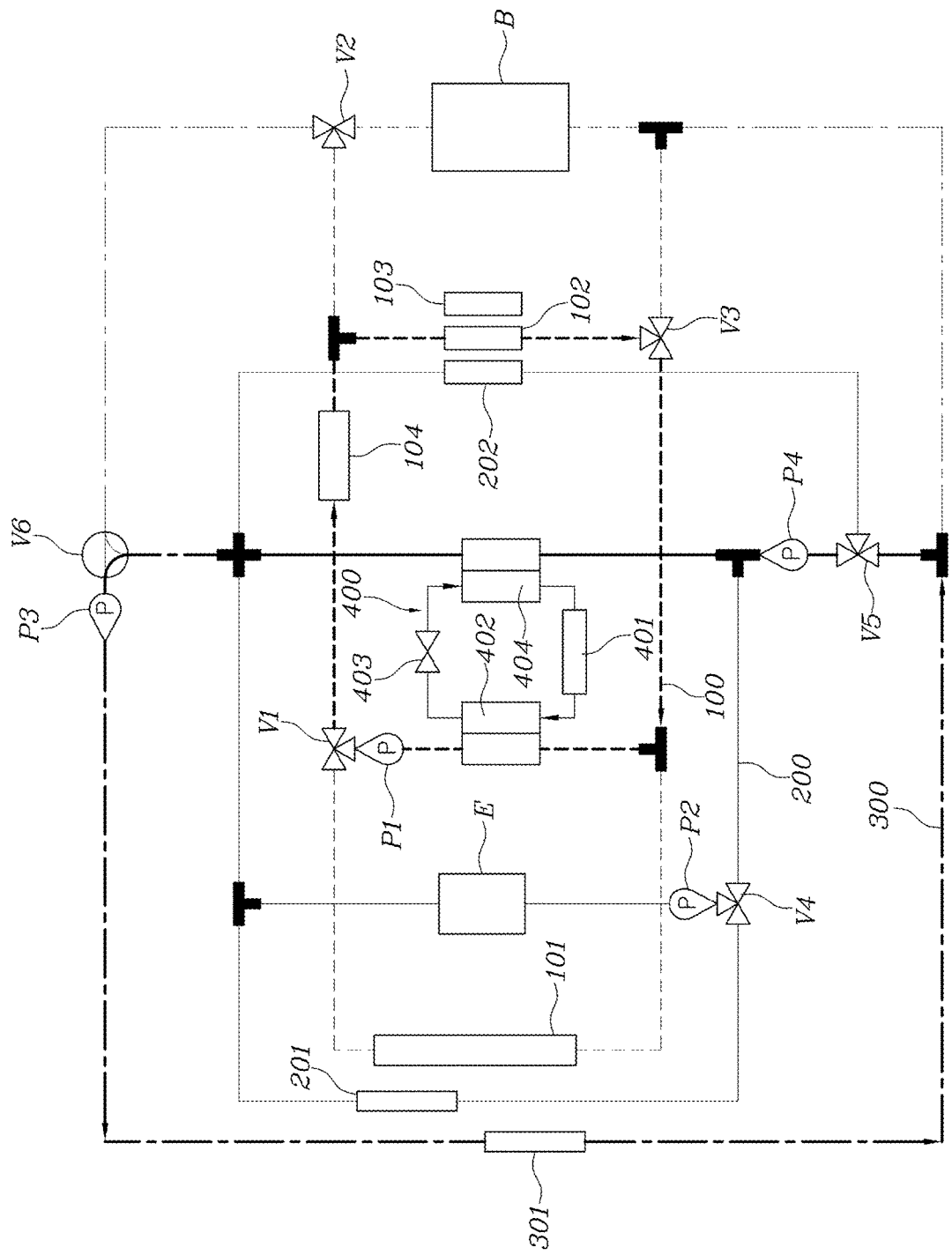

Furthermore, FIG. 7 shows a case where the internal heating is required. In the instant case, the heating core 102 is heated through the first coolant line 100 and the high-temperature core 402, and the low-temperature core 404 recovers waste heat through the second coolant line 200 and the electronic driving part E, or may recover the waste heat of the outside air through the third coolant line 300 and the third radiator 301, as shown in FIG. 8. Similarly, even in the instant case, when additional heating is required, it is possible to operate the water heater 104 or a PTC heater 103 of the internal air conditioner.

Figure 9:
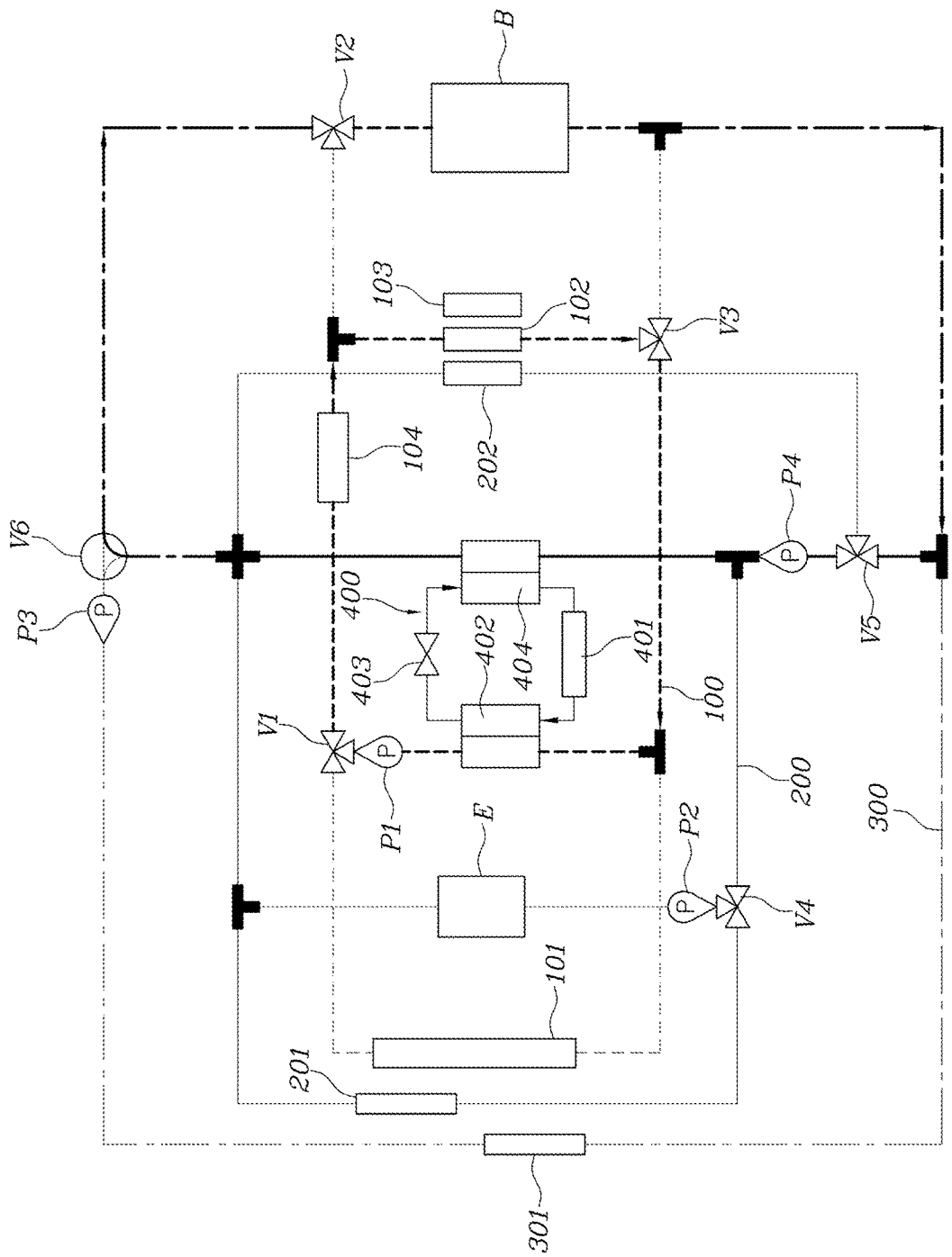

FIG. 9 shows a case where large amounts of waste heat are generated by performing rapid charging for the high-voltage battery B. In the instant case, during the internal is heated, the heating core 102 is heated through the first coolant line 100 and the high-temperature core 402, and the low-temperature core 404 may recover waste heat through the third coolant line 300 and the high-voltage battery B.

Figure 10:
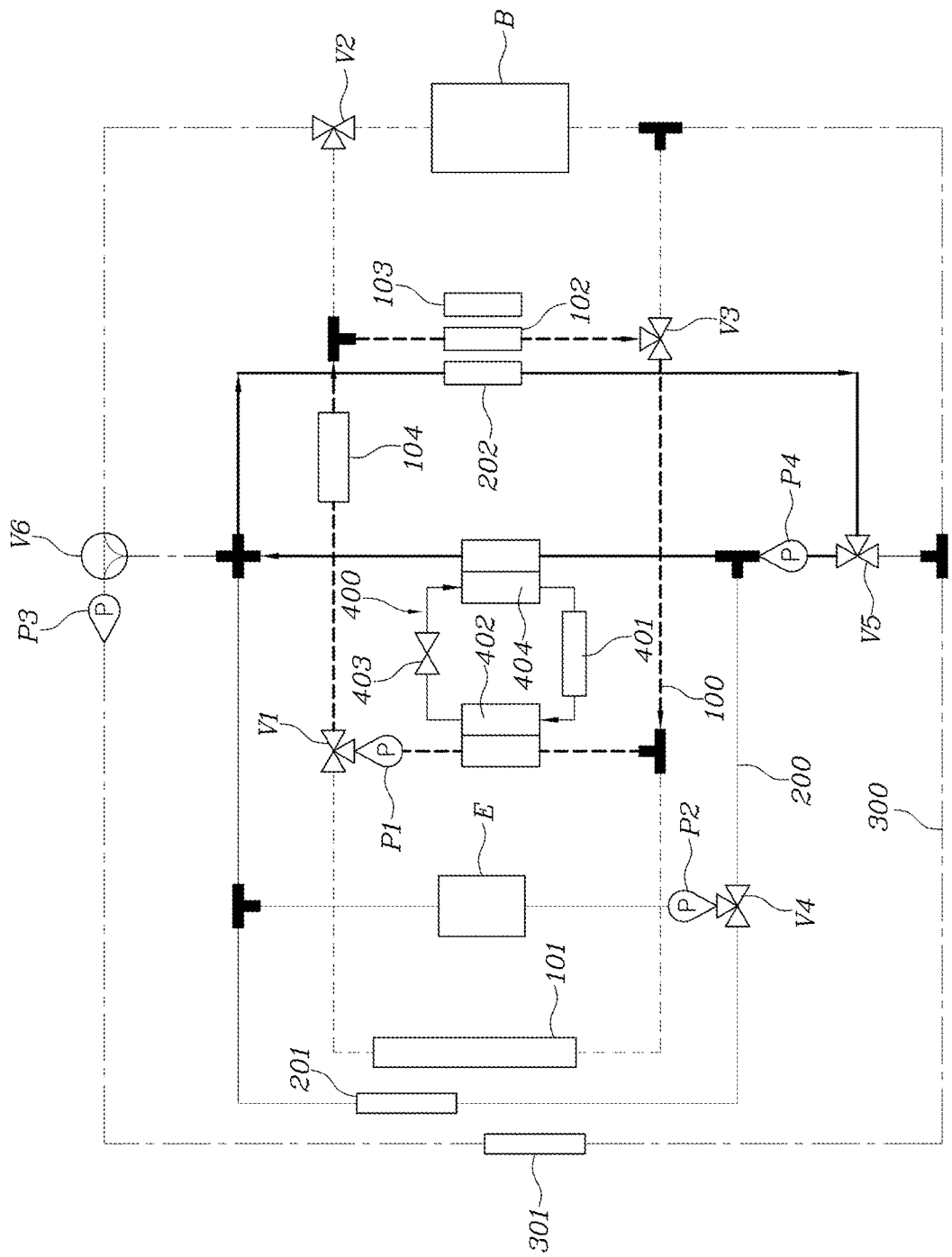

FIG. 10 shows a case where internal dehumidification is required. In the instant case, the heating core 102 is heated through the first coolant line 100 and the high-temperature core 402, and the cooling core 202 may be cooled through the second coolant line 200 and the low-temperature core 404. Accordingly, the air supplied to the interior may be supplied dry with both absolute humidity and relative humidity lowered.

Figure 11:
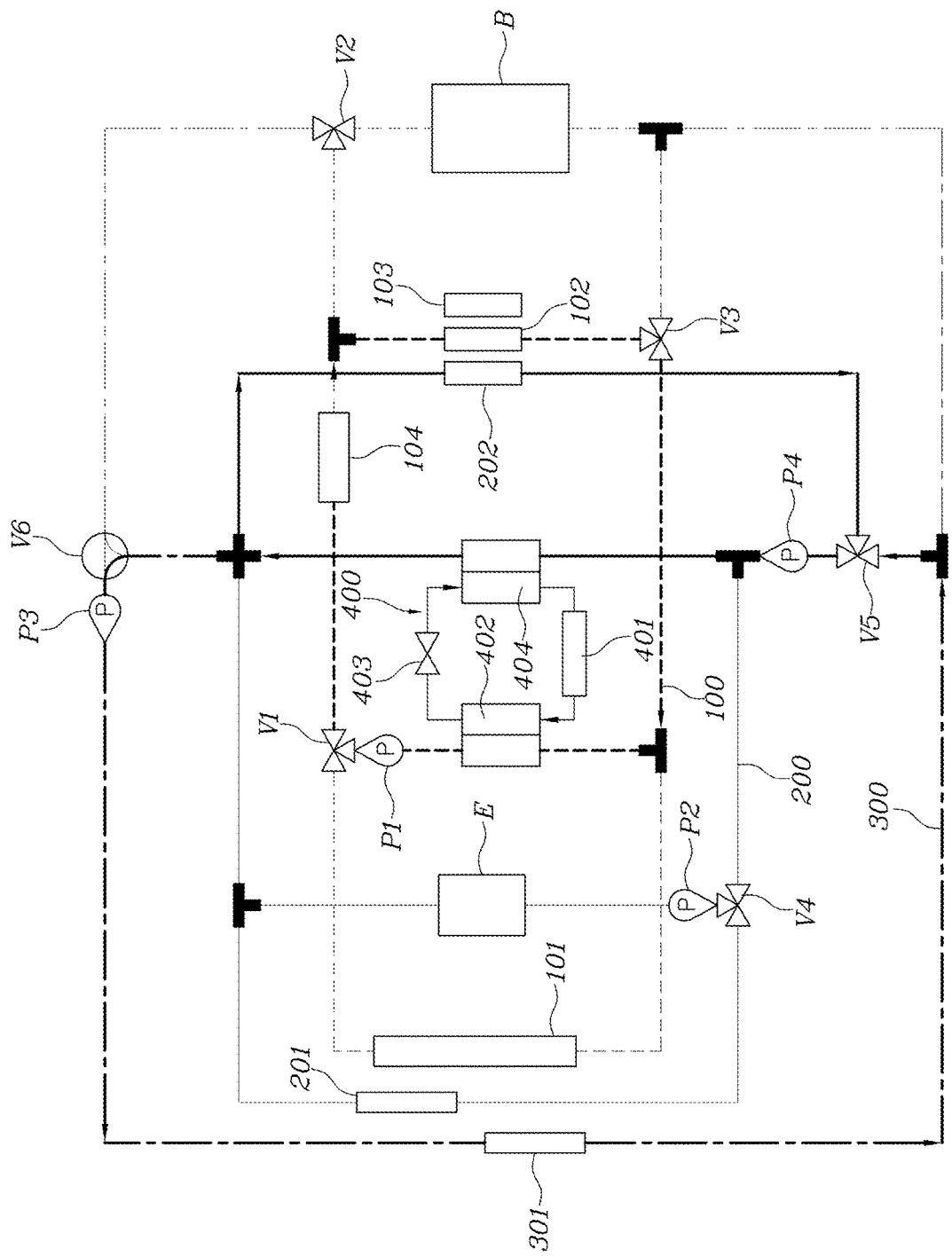

Meanwhile, as shown in FIG. 11, when the internal heating and internal dehumidification are required at a same time, the heating core 102 is heated through the first coolant line 100 and the high-temperature core 402, the cooling core 202 is cooled through the second coolant line 200 and the low-temperature core 404, and the low temperature core 404 may recover waste heat of the outside air through the third coolant line 300 and the third radiator 301.

Figure 12:
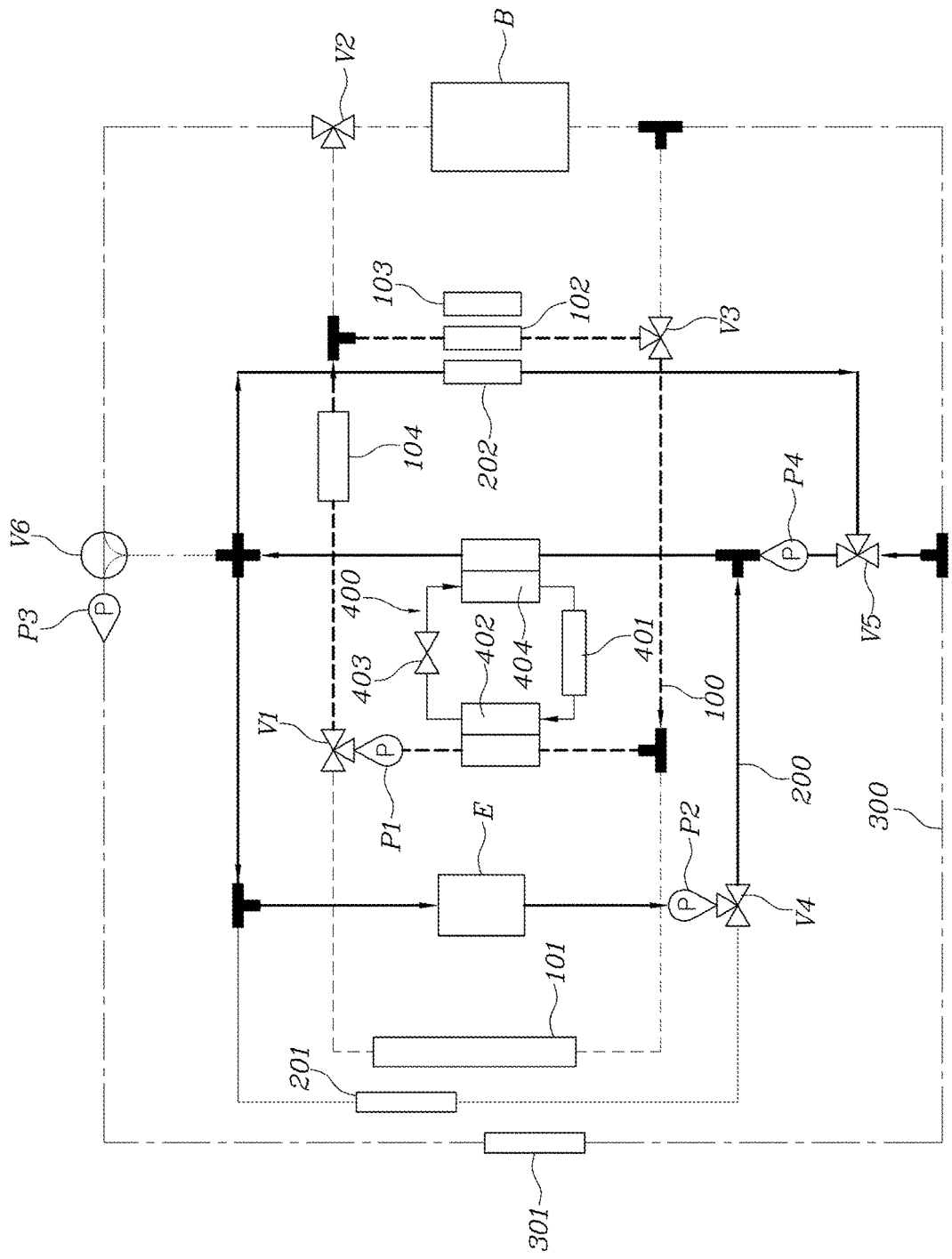

Furthermore, as shown in FIG. 12, as another method when the internal heating and internal dehumidification are required at a same time, the heating core 102 is heated through the first coolant line 100 and the high-temperature core 402, the cooling core 202 is cooled through the second coolant line 200 and the low-temperature core 404, and the low temperature core 404 may recover the waste heat through the second coolant line 200 and the electronic driving part E.

According to the integrated thermal management system of a vehicle of the present invention, the use amount of the refrigerant may be extremely reduced to be eco-friendly, and at the same time a package size of the coolant line is also decreased by reducing the number of required water pumps and multi-way valves, so that all necessary modes are able to be implemented while saving overall cost and reducing weight, and energy may be saved due to a high recovery rate of waste heat.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An integrated thermal management system for a vehicle, the system comprising:
    a refrigerant line provided with a compressor, a high-temperature core, an expansion valve, and a low-temperature core, wherein a refrigerant is circulated through the refrigerant line;
    first coolant lines that circulate coolant and interconnect a first radiator, the high-temperature core, a heating core of an internal air conditioner, and a battery in parallel;
    second coolant lines that circulate the coolant and interconnect a second radiator, an electronic driving part, the low-temperature core, and a cooling core of the internal air conditioner in parallel;
    third coolant lines that circulate the coolant and interconnect a third radiator and the battery to the second coolant lines in parallel, and
    wherein the battery is connected in parallel to upstream and downstream points of the heating core in the first coolant lines,
    wherein the electronic driving part and the third radiator are connected in parallel to upstream and downstream points of the low-temperature core through the second coolant lines and the third coolant lines, and
    wherein when battery heating and internal heating are required at a same time, the coolant that passed through the high-temperature core is branched and supplied to the battery and the heating core, and then the coolant that passed through the battery and the heating core joins and flows back into the high-temperature core, and the low-temperature core recovers waste heat through the second coolant lines and the electronic driving part, or recovers the waste heat through the third coolant lines and the third radiator.

2. The system of claim 1, wherein multi-way valves are provided at branch points of the first coolant lines, of the second coolant lines, and of the third coolant lines.

3. The system of claim 2,
    wherein the branch points include a first branch point, a second branch point, a third branch point, a fourth branch point, a fifth branch point and a sixth branch point, and
    wherein the multi-way valves includes:
        a first valve provided on the first branch point of the high-temperature core in the first coolant lines;
        a second valve provided on the second branch point of the battery in the first coolant lines;
        a third valve provided on the third branch point of the heating core in the first coolant lines;
        a fourth valve provided on the fourth branch point of the electronic driving part in the second coolant lines;
        a fifth valve provided on the fifth branch point of the cooling core in the second coolant lines; and
        a sixth valve provided on the sixth branch point of the battery, of the third radiator, and of the low-temperature core in the second coolant lines.

4. The system of claim 1, wherein a first water pump is provided on a high-temperature core side of the first coolant lines.

5. The system of claim 1, wherein a second water pump is provided on an electronic driving part side of the second coolant lines.

6. The system of claim 1, wherein a third water pump is provided on a third radiator side of the third coolant lines.

7. The system of claim 1, wherein an outlet of the cooling core of the second coolant lines and an outlet of the battery of the third coolant lines are joined with each other at a joining point, and a fourth water pump is provided at the joining point of confluence therebetween.

8. The system of claim 1, wherein, during cooling the electronic driving part by outside air, the coolant is circulated to the second radiator through the second coolant lines, and during cooling the battery by the outside air, the coolant is circulated to the third radiator through the third coolant lines.

9. The system of claim 8, wherein, when the high level of cooling of the battery and internal cooling are required at a same time, the cooling core is cooled through the second coolant lines and the low-temperature core.

10. The system of claim 1, wherein, when a high level of cooling is required for the battery, the high-temperature core radiates heat through the first coolant lines and the first radiator, and the battery is cooled through the third coolant lines and the low-temperature core.

11. The system of claim 1, wherein, when the battery heating is required, the battery is heated through the first coolant lines and the high-temperature core, and the low-temperature core recovers waste heat through the second coolant lines and the electronic driving part, or recovers the waste heat through the third coolant lines and the third radiator.

12. The system of claim 1, wherein, when the internal heating is required, the heating core is heated through the first coolant lines and the high-temperature core, and the low-temperature core recovers the waste heat through the second coolant lines and the electronic driving part, or recovers the waste heat through the third coolant lines and the third radiator.

13. The system of claim 1, wherein, when the internal heating is required, the heating core is heated through the first coolant lines and the high-temperature core, and the low-temperature core recovers the waste heat through the third coolant lines and the battery.

14. The system of claim 1, wherein, when internal dehumidification is required, the heating core is heated through the first coolant lines and the high-temperature core, and the cooling core is cooled through the second coolant lines and the low-temperature core.

15. The system of claim 1, wherein, when the internal heating and internal dehumidification are required at a same time, the heating core is heated through the first coolant lines and the high-temperature core, the cooling core is cooled through the second coolant lines and the low temperature core, and the low-temperature core recovers waste heat through the third coolant lines and the third radiator.

16. The system of claim 1, wherein, when the internal heating and internal dehumidification are required at a same time, the heating core is heated through the first coolant lines and the high-temperature core, the cooling core is cooled through the second coolant lines and the low-temperature core, and the low-temperature core recovers waste heat through the second coolant lines and the electronic driving part.

17. The system of claim 1, wherein a water heater is provided on the first coolant lines.

18. The system of claim 1, wherein a PTC heater is provided adjacent to the heating core.

* * * * *